United States Patent Office 2,878,195
Patented Mar. 17, 1959

2,878,195

PROCESS OF PREPARING AN ORGANOPOLY-SILOXANE, THE PRODUCT THEREOF, MIXTURES OF THE PRODUCT WITH RUBBERY POLYMERS, AND METHOD OF CURING THE MIXTURES

Dallas T. Hurd, Cleveland, Ohio, assignor to General Electric Company, a corporation of New York No Drawing. Application March 9, 1956
Serial No. 570,427

13 Claims. (Cl. 260—4)

This invention relates to a method of preparing organopolysiloxanes containing silicon-bonded vinyl groups (also called "vinyl-containing organopolysiloxanes") which comprises copolymerizing a mixture of (1) a substantially difunctional saturated organosilicon compound and (2) a controlled amount of a vinyl trifunctional silicon compound to produce a vinyl-containing organopolysiloxane gum which is capable of being covulcanized with a natural or synthetic rubber to produce a vulcanized elastomer. More particularly, this invention relates to a process of preparing vinyl-containing organopolysiloxanes which comprises copolymerizing a mixture of (A) a substantially difunctional saturated organosilicon compound comprising a cyclic organopolysiloxane of the formula (1) 

with (B) a controlled amount of vinyl trifunctional silicon compound having the following formula (2) 

to produce a vinyl-containing organopolysiloxane gum which is capable of being covulcanized with a natural or synthetic rubber to produce a vulcanized elastomer. This invention also relates to the products so produced. In Formulas 1 and 2 $m$ is an integer of at least 3, R represents members selected from the class consisting of alkyl radicals, cycloalkyl radicals, aryl radicals, aralkyl radicals, haloaryl radicals, etc. and mixtures of the aforesaid members, at least 50 mole percent of said members being methyl radicals, and R' is alkyl, e. g. methyl, ethyl, propyl, butyl, pentyl, etc.

Heretofore, organopolysiloxanes have been incorporated in natural or synthetic latices, gums or rubbers to enhance their properties. Although the products so prepared are satisfactory in many applications, they suffer the disadvantage of being mere mixtures of organopolysiloxanes with rubber materials. Being mere mixtures, they tend to separate from each other during storage and use. Thus, when mixtures of dimethylpolysiloxanes and natural or synthetic rubbers are stored, it is found that there is a tendency for the silicone material to "bleed" out of the rubber base so that an intimate mixture is no longer present. This same bleeding effect is also noticed when mixtures of dimethylpolysiloxane materials and these rubbers are maintained at elevated temperatures. The net effect of this bleeding is to decrease the low temperature flexibility, decrease the thermal stability, decrease the effective strength, and decrease the moisture resistance of the mixtures. This bleeding defect of rubber has been eliminated by forming true covulcanizates of the silicone material with the rubber. Thus, vinyl-containing organopolysiloxane gums have been covulcanized with well-known natural and synthetic gums to form covulcanizates of the silicone gum and these gums. These covulcanizates display no bleeding, have improved moisture resistance over prior art materials including straight natural or synthetic rubbers, have higher temperature stability than natural or synthetic rubbers, display greater flexibility at low temperature than natural or synthetic rubbers, have improved electrical properties, and are more adaptable to commercial applications than pure silicone rubbers since they are less expensive than silicone materials due to the incorporation of less expensive natural or synthetic rubbers.

Heretofore, it was believed that in order to prepare vinyl-containing organopolysiloxane gums suitable for good covulcanizates with natural or synthetic rubbers, it was necessary to use vinyl-containing difunctional silicon compounds since vinyl trifunctional silicon compounds tended to produce prematurely cross-linked organopolysiloxanes which when covulcanized would produce an inferior elastomer. Thus, in application Serial No. 450,230, Hurd et al., filed August 16, 1954, and assigned to the same assignee as the present application, it was disclosed that vinyl-containing organopolysiloxane gums suitable for covulcanizates could be prepared from compounds such as the completely condensed cyclic vinyl-containing difunctional siloxanes which are themselves prepared by separation from the hydrolysate of vinyl-containing difunctional silicon compounds, for example, methylvinyldichlorosilane, methylvinyldiethoxy, divinyldichlorosilane, divinyldiethoxysilane, etc. Although the compositions disclosed in the above applicaton possess excellent properties, they are relatively expensive since they are prepared from these relatively expensive difunctional vinyl silicon compounds.

Unexpectedly, I have now discovered a method of preparing vinyl organopolysiloxanes capable of being covulcanized with a natural or synthetic rubber to produce a vulcanized elastomer which comprises treating a mixture of (A) a substantially difunctional saturated organosilicon compound within the scope of Formula 1 and (B) 0.1–10%, based on weight of Formula 1 of a relatively inexpensive vinyl trifunctional silicon compounds within the scope of Formula 2. More particularly, this reaction is carried out by (A) admixing compounds within the scope of Formulas 1 and 2, (B) catalytically rearranging and condensing said mixture, and (C) thereupon hydrolyzing the alkoxy groups contained therein.

I have also discovered that these new vinyl-containing organopolysiloxane gums can be vulcanized with any of the well-known natural or synthetic gums. These covulcanizates display no bleeding, have improved moisture resistance over prior art materials, including straight natural or synthetic rubbers, have higher temperature stability than natural or synthetic rubbers, display greater flexibility at low temperature than natural or synthetic rubbers, have greatly improved electrical properties, and are more adaptable to commercial applications where a less expensive elastomer is required than the silicone natural or synthetic covulcanizates heretofore disclosed since the trifunctional vinyl components contained therein is less expensive than the difunctional vinyl components heretofore employed.

A typical example of a mixture of a cyclic low molecular weight organopolysiloxane and a vinyl trifunctional compound which can be treated according to this invention is a mixture of octamethylcyclotetrasiloxane and vinyltriethoxysilane. After mixing these two compounds they are rearranged and condensed to a gum by effecting reaction with a suitable organopolysiloxane rearrangement and condensation catalyst. Thereupon, any ethoxy groups remaining in the mixture are hydrolyzed with at least a stoichiometric amount of water. Excess water is advantageously used to compensate for some water which is lost by vaporization. Hydrolysis is indicated by the evolution of ethyl alcohol. The gum so produced is then covulcanized with a natural or synthetic rubber.

The low molecular weight organopolysiloxane containing only saturated hydrocarbon radicals bonded to silicon with which the vinyl trifunctional silicon compound is copolymerized may be one or more of the cyclic organopolysiloxanes described in Formula 1, where $m$ is an integer from 3 to 10 or more and R represents members selected from the class consisting of alkyl radicals, e. g., methyl, ethyl, propyl, butyl, octyl, decyl, etc. radicals; cycloalkyl radicals, e. g., cyclohexyl, cycloheptyl, etc.; aryl radicals, e. g., phenyl, diphenyl, naphthyl, etc.; tolyl, xylyl, etc.; aralkyl radicals, e. g., benzyl, phenylethyl, etc.; haloaryl radicals, e. g., chlorophenyl, dibromophenyl, etc.; and mixtures of the aforesaid radiols. At least 50 mole percent of the R's of Formula 1 should be methyl. Typical compounds within the scope of Formula 1 include, for example, octamethylcyclotetrasiloxane, tetramethyltetraethylcyclotetrasiloxane, octaphenylcyclotetrasiloxane, etc. Methods of preparing these cyclic low molecular weight organopolysiloxanes particularly octamethylcyclotetrasiloxane are described by Rochow in "Chemistry of Silicones," 2nd ed., John Wiley & Sons (1951), pp. 79–81.

The trifunctional vinyl silanes within the scope of Formula 2 employed in this invention may be prepared by the methods disclosed in the above-named Rochow text, pp. 55–56. These trifunctional vinyl silanes, although relatively inexpensive, have not found wide usage in gums because their cross-linking power is more adaptable to solid resins than to elastomers.

A critical feature of this invention is the amount of trifunctional vinyl silanes that can be incorporated into the gum without destroying its utility as a covulcanizate. Thus, the amount of trifunctional vinyl silanes that can be incorporated into the gum is 0.1% to 10% and preferably 2 to 8%, based on weight of the difunctional saturated organosilicon compound. As of present knowledge, it is not understood why these percentages of trifunctional vinyl compounds can be used, since when larger amounts are used, there is a great tendency to form siloxane cross-links.

These mixtures of compounds within Formulas 1 and 2 can be copolymerized with known organopolysiloxane rearrangement and condensation catalysts. Thus, they can be copolymerized to gums readily by using from about 0.001 to 0.5 percent by weight of strong bases such as those described in U. S. Patents 2,443,353, 2,634,252, etc. for example, potassium hydroxide, cesium hydroxide, rubidium hydroxide, etc. at elevated temperatures of the order of from about 110 to 150° C. in times ranging from about 10 to 30 minutes. In general, copolymerization of these mixtures is effected by heating to a temperature of about 110 to 150° C. and then adding the desired organopolysiloxane rearrangement and condensation catalyst. However, if desired, the catalyst may be added prior to heating of the mixture to cause polymerization to a gum to be effected when the mixture is later heated to temperatures of the order of 110 to 150° C.

Thereupon water is added to the reaction mixture at a temperature high enough to hydrolyze any alkoxy groups present in the mixture. Since it is desirable to remove alcohol or any excess water from the reaction mixture, the addition is usually carried out above 100° C. After hydrolysis is complete the vinyl gum should not be heated at elevated temperatures for long periods of time. Thus, in the case of the vinyltriethoxysilane, the gum formed therefrom should be cooled to room temperature after the ethoxy groups are hydrolyzed and the alcohol formed thereby is removed from the gum.

The natural or synthetic gums employed in the covulcanizate of the present invention may be the natural gum from which natural rubbers are prepared or any of the well-known synthetic gums from which the synthetic rubbers are prepared. The term "gum" as used in the present application is intended to mean the solid, rubbery polymer, copolymer or interpolymer from which vulcanized rubbers are prepared as distinguished from the vulcanized rubber itself. Among the synthetic gums which may be employed in the practice of the present invention are, for example, butyl gum, styrenebutadiene gum, nitrile gum, neoprene gum, polyacrylic ester gum, polysulfide gum, isobutylene gum, etc. The term "butyl gum" is intended to mean, broadly, a solid rubbery copolymer or interpolymer comprising the product of polymerization of a mass of copolymerizable materials containing by weight a major proportion of a low molecular weight olefin (monoolefin), more particularly, an isoolefin, e. g., isobutylene (isobutene), 2-ethylbutene-1, etc., and a minor proportion of a low molecular weight conjugated diolefin, e. g., butadiene, isoprene, cyclopentadiene, pentadiene-1,3, hexadiene-2,4, etc. More specific examples of butyl gums embraced by the above definition are those wherein the amount of diolefin present is from about 2 to 5 percent, by weight, of the total weight of the monoolefin and the diolefin. This butyl gum is available to the trade and is also known as GR-I. Reference is made to Thomas et al., U. S. Patent 2,356,128, issued August 22, 1944, for more detailed information concerning butyl gum, its properties and method of preparation. Typical of the compositions disclosed by Thomas et al. is a synthetic solid, plastic hydrocarbon interpolymer of a major proportion of an isoolefin having less than 8 carbon atoms per molecule and a minor proportion of a conjugated diolefin having from 4 to 8, inclusive, carbon atoms per molecule, which interpolymer is characterized by low saturation as evidenced by an iodine number below 50, a molecular weight about 15,000, and an approximate specific gravity of 0.91. Butyl gum also includes copolymers of isobutylene and small amounts of isoprene as well as those copolymers wherein butadiene, dimethylbutadiene, or piperylene is substituted for isoprene in the isobutylene copolymer.

Styrene-butadiene gum, commonly referred to as GR-S or styrene gum is a copolymer of approximately 70 to 80 percent of butadiene and 20 to 30 percent of styrene. Nitrile gum, commonly known as Buna N, refers to a copolymer of butadiene and acrylonitrile containing from about 55 to 80 percent butadiene and 20 to 45 percent, by weight, of acrylonitrile. Neoprene gum is a high molecular weight polymer of chloroprene (2-chlorobutadiene). The polyacrylic ester gums are high molecular weight condensation products of acrylic acids and alcohols such as n-butanol. Polysulfide gums are the rubbery condensation products of an organic dihalide and an alkaline polysulfide. Isobutylene gum is the high molecular weight homopolymer of isobutylene. For a more complete discussion of the compositions, properties, and preparation of the synthetic gums within the scope of the present invention, attention is directed to "Modern Synthetic Rubbers," by Harry Barron, published in 1944 by D. Van Nostrand Co., New York, N. Y.; "Vinyl and Related Polymers," by Calvin E. Schildknecht, published in 1952 by John Wiley & Sons, Inc., New York, N. Y.; and to "Synthetic Rubber," by G. S. Whitby, published in 1954 by John Wiley & Sons, Inc., New York, N. Y.

The covulcanizable mixture of the vinyl-containing organopolysiloxane and the natural or synthetic gum may be vulcanized in the same manner as a 100 percent natural or synthetic gum is vulcanized. Thus, typical sulfur vulcanization agents including sulfur, sulfur halides, or sulfides may be used to effect vulcanization. The vulcanizable material may also contain any of the various reinforcing fillers such as carbon black, zinc oxide, clay, whiting, slate flour, silica, etc., incorporated into the covulcanizable mixture. Preferably, I employ carbon black as a filler for the covulcanizable material of the present invention since carbon black appears to be the most effective reinforcing agent and is relatively inexpensive. As in the case of 100 percent natural or synthetic rubbers, the covulcanizate of the present invention may have incorporated therein cure accelerators such as mercaptobenzothiazole, diphenylguanidine, tetramethylthiuramdisulfide, zinc dimethyldithiocarbamate, benzothiazodisulfide, etc. The covulcanizate also may have incorporated therein accelerator activators such as zinc oxide, stearic acid, etc., as well as softeners, odorants, and pigments. In general, the formulation for the covulcanizate of the present invention comprises (A) from 45 to 99 percent, by weight, of a mixture of from 25 to 95 percent natural or synthetic gum and 5 to 75 percent, by weight, of a vinyl-containing organopolysiloxane gum which is prepared from a mixture of the compounds coming within the scope of Formulas 1, and 2, (B) from 0 to 50 percent, by weight, of filler, and (C) from 1 to 5 percent, by weight, of a sulfur curing agent. Where an accelerator is employed, I employ from about 0.5 to 5 percent of the accelerator, based on the total weight of the covulcanizate, and from about 0.5 to 5 percent, by weight, of an accelerator activator, based on the weight of the covulcanizate.

The covulcanizable materials of the present invention may be prepared by thoroughly mixing the natural or synthetic gum with the vinyl-containing organopolysiloxane gum on a differential rubber milling roll or in a Banbury mixer. The two ingredients are milled with the required amount of the sulfur vulcanization agent until a completely uniform mixture is obtained. Where the covulcanizate has a filler and an accelerator and an accelerator activator incorporated therein, the ingredients are milled in a similar manner on rubber differential rolls or in a Banbury mixer until a uniform mixture is obtained. After milling of the covulcanizable mixture is effected, vulcanization is effected by heating the mixture at temperatures from about 110 to 160° C. until vulcanization is completed. This heating operation may take place in an oven at atmospheric pressure, or in a heated press, or on heated rolls or in an extrusion apparatus. The time required for vulcanization varies from a few minutes to several hours depending on the particular materials employed and whether or not a vulcanization accelerator is employed.

The following examples are illustrative of the practice of our invention and are not intended for purposes of limitation. All parts are by weight.

*Example 1*

A mixture of 100 parts of octamethylcyclotetrasiloxane and 4 parts of vinyltriethoxysilane was heated to 150° C. whereupon 0.1 part of cesium hydroxide was added. Within about ten minutes, the siloxane had polymerized to a syrup and it appeared that polymerization would proceed no further. At this point while the temperature was about 150° C. sufficient water was added dropwise to hydrolyze the ethoxy groups as the reaction was vigorously stirred. This required somewhat more than the stoichiometric quantity owing to some loss of water by volatilization from the hot mixture. Copious quantities of ethyl alcohol vapor were released from the mixture during this hydrolysis, and when the evolution of alcohol ceased, the addition of water was stopped. Within a few minutes the material had polymerized to a gum which was then allowed to cool to room temperature.

*Example 2*

One hundred parts of the gum prepared in Example 1 were milled with 100 parts of butyl rubber gum (a copolymer of diolefin and a major proportion of isobutylene, namely, 2 parts by weight of isoprene and 98 parts by weight of isobutylene). To this thoroughly mixed blend were added 100 parts of carbon black filler (Kosmos 60), 3 parts of sulfur together with 1 part of an accelerator (benzothiazyl disulfide, $(C_6H_4NCS)_2S_2$, and 1 part of zinc oxide. The resulting milled product was press-cured for ¾ hour at 150° C. and then further cured in an oven for 1 hour at 150° C.

The elastomer so produced appeared to be a true covulcanizate since it exhibited no "bleeding" of the silicone phase after several days at room temperature. The elastomer had a room temperature tensile strength of 850 p. s. i. and was flexible at a temperature as low as −30° C.

*Example 3*

Similar covulcanizates are also prepared in the manner of Example 2 except that other natural or synthetic rubbers are substituted for the butyl gum. Covulcanizates are prepared with (1) a milled pale natural crepe gum, (2) a nitrile gum (a copolymer of approximately 65 percent butadiene and 35 percent acrylontrile), and (3) GR–S gum (a copolymer of 76.5 percent of butadiene and 23.5 percent of styrene).

Although the foregoing examples describe covulcanizable mixtures of various natural or synthetic gums and a specific vinyl-containing organopolysiloxane gum, it should be understood that other natural or synthetic rubbers (e. g. other natural rubber gums, other butyl gums, other nitrile gums, neoprene gums, polyacrylic ester gums, polysulfide gums, isobutylene gums, or any of those gums heretofore described), and other organopolysiloxane gums containing other saturated groups (e. g. as ethyl, phenyl, cyclohexyl, etc.), and unsaturated groups (e. g. allyl, substituted allyl such as methallyl, etc.) may be used in place of, or in addition to, these ingredients disclosed in the examples. Although the examples disclose only covulcanizates containing fillers, it should be understood that the mixtures of the present invention may be cured by sulfur without the addition of any filler.

The covulcanizable mixtures of the present invention are useful per se as a dielectric material in transformers, capacitors and the like where extremes of temperatures are encountered and are useful per se as intermediates in the preparation of covulcanized rubbery products. These covulcanized rubbery products, whether containing fillers or not, are valuable as gasket material, wire coating material, as fillers for electrical cables, as encasing materials for transformers, capacitors, and the like where extreme resistance to changes in temperatures is desired along with high dielectric strength, moisture resistance, and relatively low cost, and for other application, such as aircraft tires, rubber tires or structural parts for automotive vehicles, military equipment, etc. where improved flexibility and strength over a wide range of temperature is desired.

What I claim as new and desire to secure by Letters Patent of the United States is:

1. A process of preparing a vinyl-containing organopolysiloxane which comprises admixing (1) a cyclic organopolysiloxane of the formula $[(R)_2SiO]_m$ and (2) 0.1–10%, based on the weight of (1), of an organosilane of the formula $CH_2=CHSi(OR')_3$ where $m$ is an integer and is at least 3; R is a member selected from the group consisting of alkyl, cycloalkyl, aryl, aralkyl, and haloaryl radicals at least 50 mole percent of said members being methyl radicals; and R' is alkyl; reacting said mixture of (1) and (2) in the presence of a strong base and thereafter hydrolyzing the resulting condensate.

2. The vinyl-containing organopolysiloxane produced by the method of claim 1.

3. A composition comprising (*a*) the product of claim 2 and (*b*) a member selected from the group consisting of natural rubber, rubbery synthetic polymers of a conjugated diene, rubbery polymers of acrylic acid esters, rubbery polysulfide polymers which are condensation products of an organic dihalide and an alkaline polysulfide, and rubbery homopolymers of isobutylene.

4. The cured product obtained by heating the composition of claim 3 to a temperature in the range of 110 to 160° C. in the presence of a sulfur vulcanizing agent.

5. A composition comprising (*a*) the product of claim 2 and (*b*) natural rubber.

6. The cured composition obtained by heating the product of claim 5 to a temperature in the range of 110 to 160° C. in the presence of a sulfur vulcanizing agent.

7. A composition comprising (a) the product of claim 2 and (b) a rubbery copolymer of isobutylene and a minor proportion of a conjugated diene.

8. The cured composition obtained by heating the product of claim 7 to a temperature in the range of 110 to 160° C. in the presence of a sulfur vulcanizing agent.

9. The composition comprising (a) the product of claim 2 and (b) a rubbery copolymer of butadiene and styrene.

10. The cured composition obtained by heating the product of claim 9 to a temperature in the range of 110 to 160° C. in the presence of a sulfur vulcanizing agent.

11. The composition comprising (a) the product of claim 2 and (b) a rubbery copolymer of butadiene and acrylonitrile.

12. The cured composition obtained by heating the product of claim 11 to a temperature in the range of 110 to 160° C. in the presence of a sulfur vulcanizing agent.

13. A method of curing a composition comprising (a) the product of claim 2 and (b) a member selected from the group consisting of natural rubber, rubbery synthetic polymers of a conjugated diene, rubbery polymers of acrylic acid esters, rubbery polysulfide polymers which are condensation products of an organic dihalide and an alkaline polysulfide, and rubbery homopolymers of isobutylene, and (c) 1 to 5% sulfur, based on the total weight of the composition, which comprises heating said blend of (a), (b), and (c) to a temperature in the range of 110 to 160° C.

References Cited in the file of this patent
UNITED STATES PATENTS

| | | |
|---|---|---|
| 2,445,794 | Marsden | July 27, 1948 |
| 2,589,317 | Young et al. | Mar. 18, 1952 |
| 2,737,506 | Hurd et al. | Mar. 6, 1956 |

OTHER REFERENCES

Kantor et al.: Jour. Am. Chem. Soc., 77 (1955), 1685–1687.

Hauser: Rubber Age, April 1955, pages 73–76.

Mark et al.: "Collected Papers of Wallace H. Carothers," pages 391, 392, published 1940, Interscience, N. Y.